US011975438B2

(12) United States Patent
Korbuly et al.

(10) Patent No.: US 11,975,438 B2
(45) Date of Patent: May 7, 2024

(54) PRECISION TOOL HOLDER

(71) Applicant: Cricut, Inc., South Jordan, UT (US)

(72) Inventors: Marc Korbuly, Salt Lake City, UT (US); Jeffery V. Gubler, Orem, UT (US); Ildefonso M. Resuello, Jr., Sacramento, CA (US); Grayson Stopp, San Francisco, CA (US); Thomas Crisp, Cottonwood Heights, UT (US)

(73) Assignee: Cricut, Inc., South Jordan, UT (US)

( * ) Notice: Subject to any disclaimer, the term of this patent is extended or adjusted under 35 U.S.C. 154(b) by 746 days.

(21) Appl. No.: 17/044,585

(22) PCT Filed: Apr. 8, 2019

(86) PCT No.: PCT/US2019/026336
§ 371 (c)(1),
(2) Date: Oct. 1, 2020

(87) PCT Pub. No.: WO2019/195837
PCT Pub. Date: Oct. 10, 2019

(65) Prior Publication Data
US 2021/0023691 A1 Jan. 28, 2021

Related U.S. Application Data

(60) Provisional application No. 62/654,144, filed on Apr. 6, 2018.

(51) Int. Cl.
*B25G 3/12* (2006.01)
*B26B 5/00* (2006.01)

(52) U.S. Cl.
CPC . *B25G 3/12* (2013.01); *B26B 5/00* (2013.01)

(58) Field of Classification Search
CPC .................................. B25G 3/12; B26B 5/00
USPC .......................................................... 81/491
See application file for complete search history.

(56) References Cited

U.S. PATENT DOCUMENTS

| | | | | |
|---|---|---|---|---|
| 4,865,485 A | | 9/1989 | Finnefrock, Sr. | |
| 5,752,285 A | * | 5/1998 | Bendheim | B25G 1/04 294/51 |
| 5,816,633 A | * | 10/1998 | Odom | A01B 1/227 294/51 |
| 6,588,994 B2 | * | 7/2003 | Wienhold | B23B 31/005 81/177.1 |

(Continued)

FOREIGN PATENT DOCUMENTS

| | | | |
|---|---|---|---|
| CN | 204893997 U | | 12/2015 |
| DE | 102006053592 A1 | | 5/2007 |
| WO | WO-2008010144 A2 | | 1/2008 |

OTHER PUBLICATIONS

IP Australia, Examination Report No. 1 for Application No. 2019247929, dated Jun. 30, 2021.

(Continued)

*Primary Examiner* — Hadi Shakeri
(74) *Attorney, Agent, or Firm* — Honigman LLP; Grant Griffith

(57) ABSTRACT

A tool holder including a main body, an activation button coupled to the main body, a tool securing portion at least in directly coupled to the activation button, wherein the activation button can be activated into a first state for coupling a tool to the tool holder and a second state for decoupling a tool from the tool holder.

10 Claims, 11 Drawing Sheets

(56) References Cited

U.S. PATENT DOCUMENTS

| | | | |
|---|---|---|---|
| 7,059,420 B1 | 6/2006 | Wei | |
| 7,574,768 B2 | 8/2009 | Morris et al. | |
| 7,922,180 B2 * | 4/2011 | Meng | B25B 15/001<br>279/143 |
| 2006/0118499 A1 | 6/2006 | Kao | |
| 2010/0219594 A1 | 9/2010 | Nash | |
| 2012/0074658 A1 | 3/2012 | Puzio et al. | |
| 2016/0052125 A1 | 2/2016 | Steele et al. | |

OTHER PUBLICATIONS

International Search Report and Written Opinion for Application PCT/US2019/026336 dated Jul. 23, 2019.

* cited by examiner

PRECISION TOOL HOLDER

CROSS REFERENCE TO RELATED APPLICATIONS

This U.S. patent application is the national phase of International Application No. PCT/US2019/026336, filed on Apr. 8, 2019, which claims priority under 35 U.S.C. § 119(e) to U.S. Provisional Application 62/654,144, filed on Apr. 6, 2018. The disclosures of these prior applications are considered part of the disclosure of this application and are hereby incorporated by reference in their entireties.

TECHNICAL FIELD

The present invention relates generally to tool holders.

BRIEF SUMMARY OF THE INVENTION

The invention generally relates to a tool holder which may include: an activation portion, a main housing portion, and a tool securing portion.

There has thus been broadly outlined some of the features of the invention in order that the detailed description thereof may be better understood, and in order that the present contribution to the art may be better appreciated. There are additional features of the invention that will be described hereinafter.

In this respect, before explaining any embodiment of the invention in detail, the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a tool holder to be used to provide a properly oriented and secure tool allowing for consistent and accurate handheld cuts.

Another object is to provide a tool holder which holds tools more securely and does so over longer periods of use than the current alternatives.

Another object is to provide a tool holder with a more ergonomic grip.

Another object is to provide a locking portion and a method of changing the tools from a tool holder that increases the user's safety.

Other objects and advantages of the present invention will become obvious to the reader. It is intended that these objects and advantages be within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

Implementations of the disclosure may include one or more of the following features.

DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views.

The disclosure will now be described, by way of example, with reference to the accompanying drawings, in which.

REFERENCE NUMERALS

Figure 1:
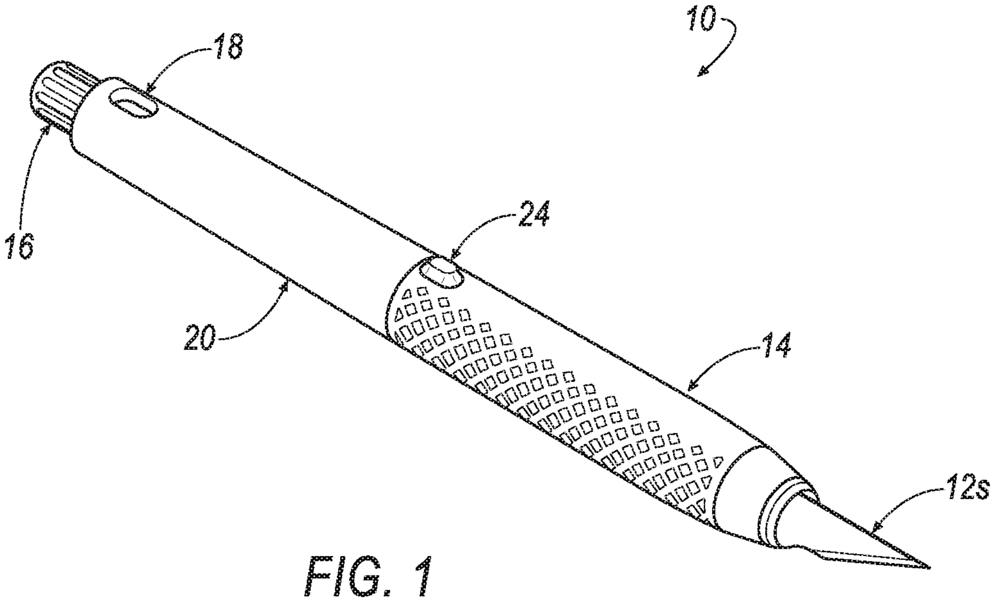
FIG. 1 is an isometric view of an exemplary tool holder with the tool exposed for use.
Figure 2:
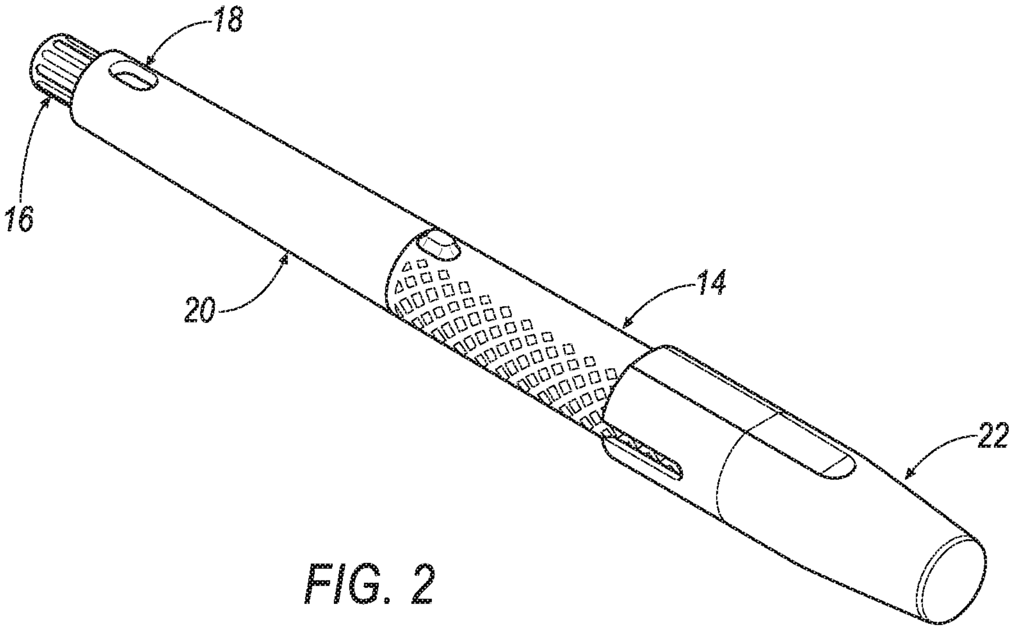
FIG. 2 is an isometric view of an exemplary tool holder with a protective cap covering the tool.
Figure 3:
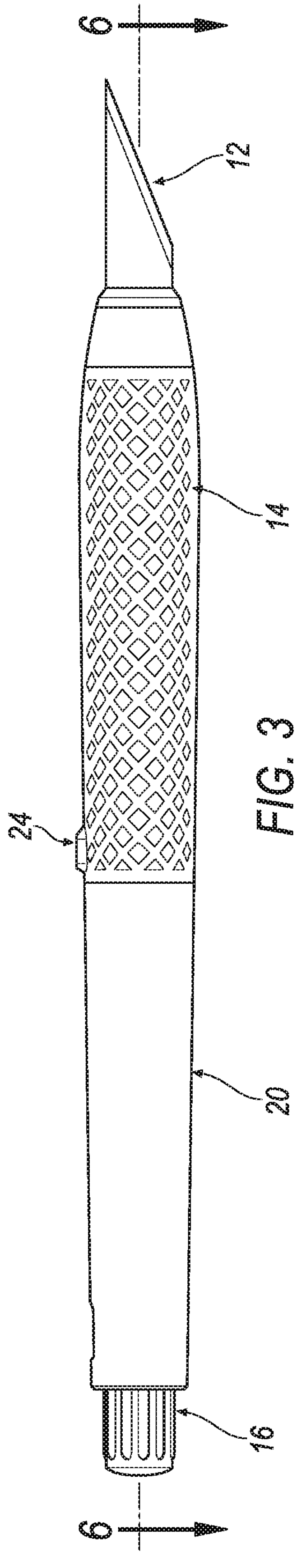
FIG. 3 is a side view of an exemplary tool holder.
Figure 4:
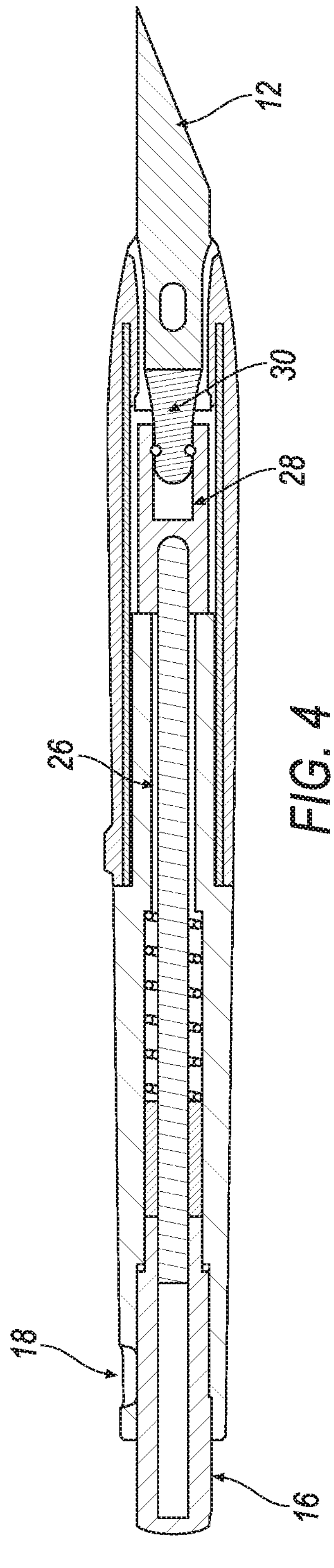
FIG. 4 is a cross-sectional front view taken substantially along the lines 4-4 of FIG. 5.
Figure 5:
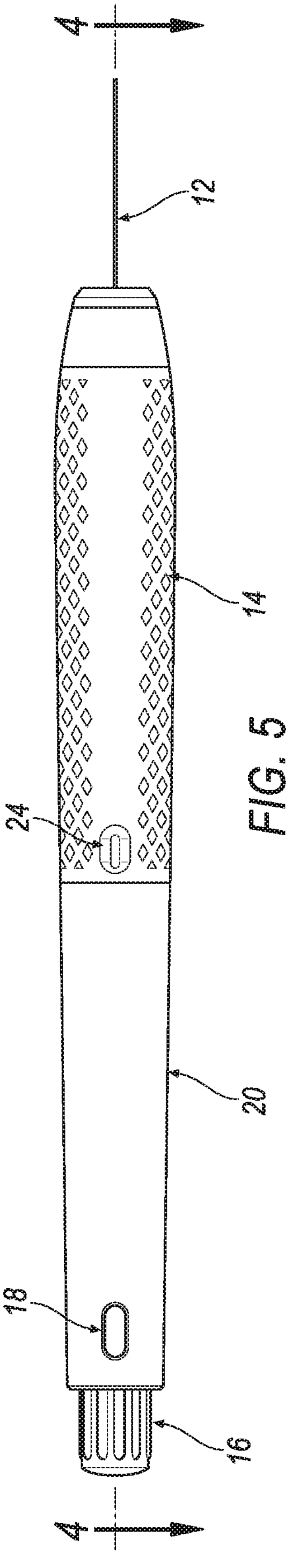
FIG. 5 is a top view of an exemplary tool holder.
Figure 6:
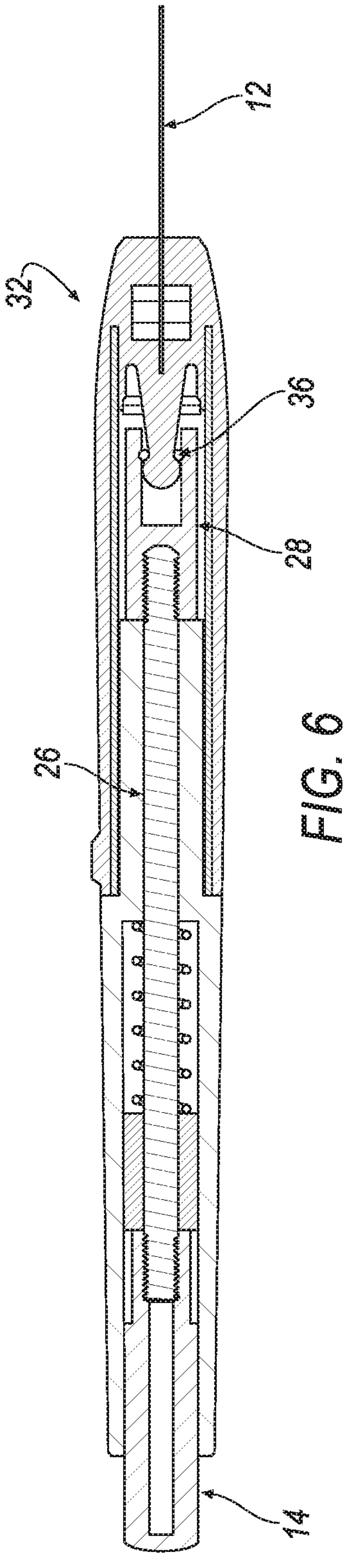
FIG. 6 is a cross-sectional view taken substantially along lines 6-6 of FIG. 3.
Figure 7:
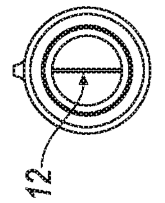
FIG. 7 is a front view of an exemplary tool holder.

10. Tool Holder;
12. Tool;
14. Grip;
16. Button;
18. Lock Display;
20. Main Housing or Body;
22. Cap or Safety Cap;
24. Anti-Rollover Feature;
26. Shaft;
28. Retainer;
30. Tool Overmold;
31. Generally Spherical Bulb;
32. Securing Portion;
34. Tip;
36. Ball Bearing(s);
38. Tube;
40. Spring;
42. Sub-Button;
44. Locking Mechanism;
46. Datum;
48. Ball Feature;
50. Tool Package;
52. Lip Capture;
54. Tool Cavity.

DETAILED DESCRIPTION OF THE INVENTION

A. Overview

Throughout history, it has been known that individuals have found a sense of personal fulfillment/achievement/satisfaction/expression by creating art. In recent times, during the late $19^{th}$ century, an art reform & social movement led by skilled tradesmen was slowly starting to be recognized by many people across America, Canada, Great Britain and Australia. This movement has often been referred to as the "Arts-and-Crafts Movement."

The so-called "Arts-and-Crafts Movement" that began many years ago has continued to evolve today by many persons that may not necessarily be skilled in a particular trade. As such, it may be said that non-skilled persons may be involved in the "arts-and-crafts" as a social activity or hobby. In some circumstances, the activity or hobby may be practiced for any number of reasons ranging from, for example: economic gain, gifting, or simply to pass time while finding a sense of personal fulfillment/achievement/satisfaction/expression.

With advances in modern technology, the "Arts-and-Crafts Movement" that began many years ago is nevertheless susceptible to further advancements that may enhance or improve, for example, the way a skilled or non-skilled person may contribute to the arts-and-crafts. Therefore, a need exists for the development of improved components, devices and the like that advance the art.

Tool holders and their associated tools have been developed to assist crafters from the fanatical and experienced crafter to the novice crafter in exploring their creativity. These users have a need to more safely, quickly and precisely manipulate various mediums by hand to fully realize their design and creativity.

B. Cutting/Piercing Tools

Some tools are blunt and do not pose a significant danger to the user. However, there exists a class of tools that are used for cutting, piercing, weeding, and the like that must, by their very nature, be sharp if they are going to be effective for accomplishing the task that there are designed to be used for. This class of tools are potentially dangerous to the user. For example, one of the major concerns for existing tool holders is the security of a cutting or piercing tool when placed in the holder (especially over multiple uses) and safety in changing tools, but also in storing and using the tool holders. Specifically, one of the biggest problems with the current tool holders on the market is that the mechanism by which the tool is secured by the tool holder loosens over time or over multiple cuts thereby creating a safety concern in using the tool or at the very least reducing the precision by which the tool can be controlled to achieve the desired cuts. Further, there are additional safety concerns when a tool holder requires that a user hold the tool in their hands in order to insert the tool in the tool holder. The invention described, herein addresses these problems.

And embodiment of the invention is a tool holder suitable for holding blades, piercing tools, weeding tools and the like.

Figure 8:
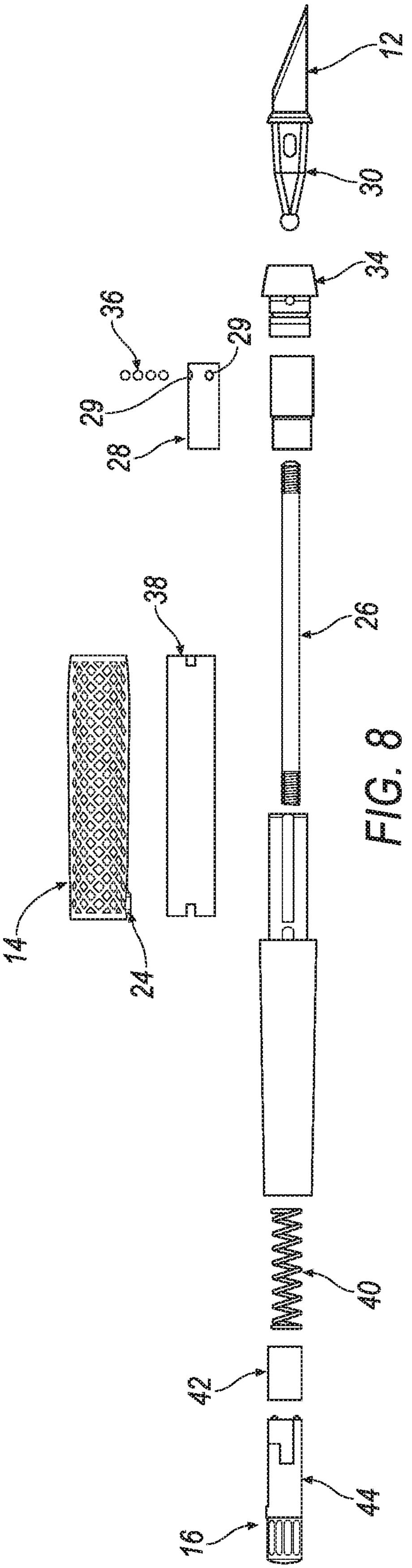
FIG. 8 is an exploded view of an exemplary tool holder.

Now referring to FIG. 1 and FIG. 8, in an embodiment, tool holder 10 includes a securing portion 32 which houses multiple retaining elements 36 such as spherical elements, ball bearings, or the like. Elements 36 can be fabricated from steel, nylon, or any other suitable material. Elements 36 are captured in a volume that is at least partially defined by retainer 28. As a user depresses button 16, retainer 28 moves forward allowing elements 36 to move radially outward, thereby releasing their grip on the overmold 30 portion of tool 12. Elements 36 are sized in relation to the retainer volume such that they are freely allowed to recede into the volume defined by retainer 28 thus allowing them to move radially outward to a sufficient degree to allow the overmold 32 to be released from the grip of elements 36. Once the user releases the button 16, the elements 36 naturally return to their original or resting position. If a tool 12 is inserted into the tool retainer (when button 16 is depressed), then, when the button 16 is released, elements 36 return to their resting position, thereby surrounding the tool overmold 30 and securely gripping the tool 12 in place. Tool 12 can be comprised of any number of tools including a seam ripper, a scoring tool, a knife blade, a piercing tool, a weeder, a hook weeder, or the like.

In an embodiment, the tool release method uses multiple elements 36 instead of just one. The two important features of the invention include 1) it's actuation does not require manipulating a sleeve, but simply pushing a button, thereby allowing the user to actuate the gripping mechanism with one hand, and 2) the method is disclosed for use in conjunction with a hand tool. Tool 12 may reside in a safety holder (e.g. foam) or other tool securing device and only one hand is required to load/unload the tool into/from the tool holder (i.e. to push/hold down the button 16 activating the securing portion 32).

More specifically, when actuated, elements 36 are captured within the volume created by the retainer 28. The retainer 28 is designed to contain elements 36 thereby preventing them from migrating away from their usable position. In an embodiment, elements 36 are, at least partially, captured by backer wall of retainer 28. When the user actuates or releases button 16 a relief gap is presented behind the elements 36 allowing them to migrate radially into the relief gap (away from the blade overmold 30) thereby releasing their grip on tool 12.

An advantage of the instant invention is that it's does not require any further action from the user in order to change tools. For instance, current alternatives utilize a screw fastener rather than the novel quick release hands free tool changing system found in the current invention.

An alternate embodiment of the current invention contains a retainer 28 which is shaped with a keyed geometry (e.g. flats, slots, or the like) such that tool 12 and tool overmold 30 can only be oriented in a predefined orientation thereby preventing the tool 12 from spinning and allowing the tool to be indexed with other features of the tool holder 10 (e.g. grip 14).

In an embodiment, the end of the tool overmold 30 may contain a registration datum 46 (such as a catch, shoulder, lip, ledge, depression, trough, ridge, or the like) so that as the button 16 is released and the elements 36 move into position a secure fit is formed around the datum 46 thereby securing the tool overmold 30 and tool 12 with the tool holder. In an embodiment, the outer profile of the geometry of the datum 46 closely matches with the mating profile of the geometry of the elements 36 giving rise to tight tolerances therebetween which reduces play or movement between tool 12 and securing portion 32 even through repeated uses.

Figure 12:
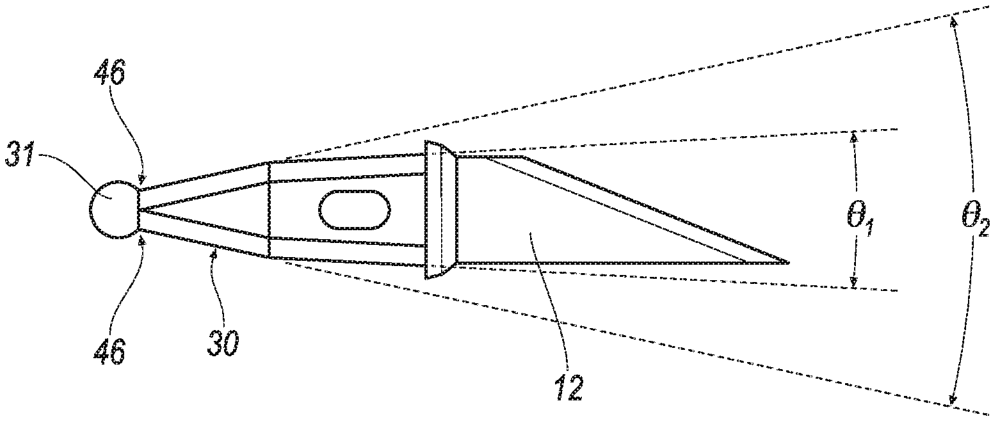
FIG. 12 shows an embodiment of a tool (e.g., blade 12 with a blade overmold portion 30, wherein the blade overmold portion is formed with at least one taper, $\theta_1$.

Now referring to FIGS. 8 and 12, locking mechanism 44 is spring loaded by spring 40 so that it urges tool 12 into the tool holder 10 until the flat (or other aligning feature) comes into contact with the retainer 28 (e.g. lip of the retainer). Further, in an embodiment, tool overmold 30 may be formed with one or more tapered sides to provide additional security through a wedging action, so the tool 12 is restricted from moving or being released during use. In an embodiment, blade overmold 30 is fitted with at least one taper, $\theta_1$ (see FIG. 12) to provide additional security through a wedging action. Optionally, blade overmold 30 may be formed with first and second tapered portions $\theta_1$, $\theta_2$ to provide even more wedging force. Blade overmold 30 may terminate into any number of geometries which allows elements 36 to engage it and urge it into a wedged position. In an embodiment, the terminating geometry may be generally bulbous shaped 31 wherein the elements 36 can wedge themselves into the neck portion 46 of the bulb.

Optionally, locking mechanism 44 works with the ball detent 29 on FIG. 8 of the securing portion 32, but does not require the use of spherical members 36. Specifically, as the user depresses button 16, two ridges along the locking mechanism 44 guide the movement of button 16. When the locking mechanism 44 is rotated (e.g. turned clockwise) the button 16 is not allowed to move along the ridges/grooves any longer because it is restricted by the internal geometry (e.g., there is a portion of button 16 or knife handle 20, or both, which restricts it from doing so) therefore allowing the user to lock the blade 12 during use. The user may then rotate or twist the locking mechanism 44 (e.g. in an opposite direction, counter-clockwise) to unlock the button 16.

Still, and yet another option, locking mechanism 44 includes at least one spherical feature 48 (or a round) or multiple ball features molded into the opposite end from the button 16. As the locking mechanism 44 turns, the ball feature 48 moves across different positions. When the ball feature 48 encounters a position 48' where it can rest, it seats into a known position (such as recess 48'). There are at least two positions 48' (e.g., detents or holes). One for locked and one for unlocked. When locked, the sub-button 42 is prevented from moving up and down the shaft 26. Otherwise, when not in a locked position, the sub-button 42 is free to move up and down the shaft 26 when the button 16 is actuated by the user.

In an alternate embodiment, the locking mechanism 44 includes an over-cam solution where the plastics form a sort of hill or ramp so that when the button 16 is turned the over cam piece had to be moved over the hill in order to rest in a locked position.

When the button 16 is in a locked or rotated position linear motion within the tool is prevented and the elements 36 are locked in place and secured around the datum 46 thus securing the tool.

Figure 15:
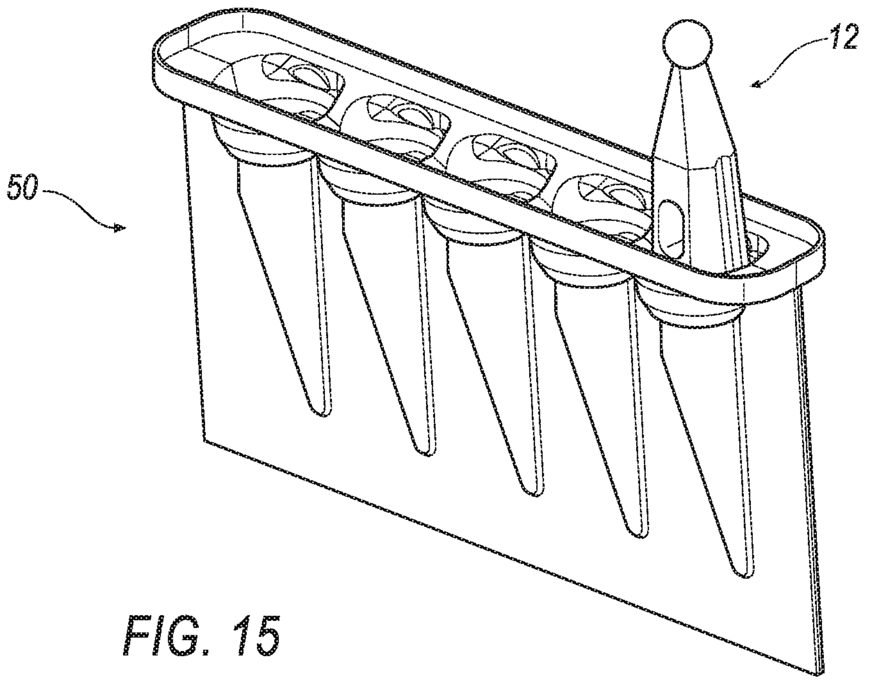
Figure 16:
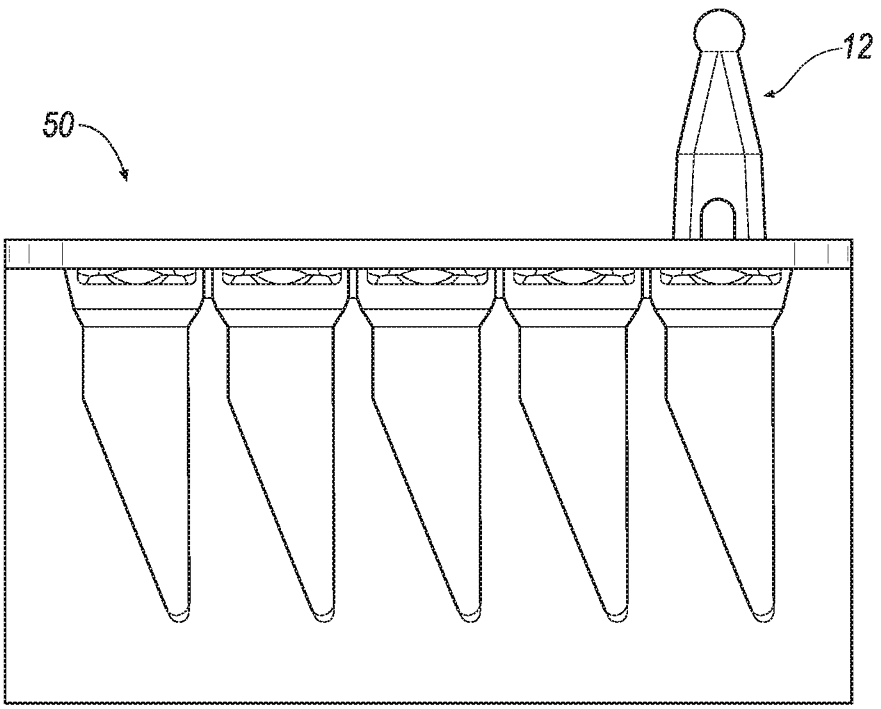
Figure 17:
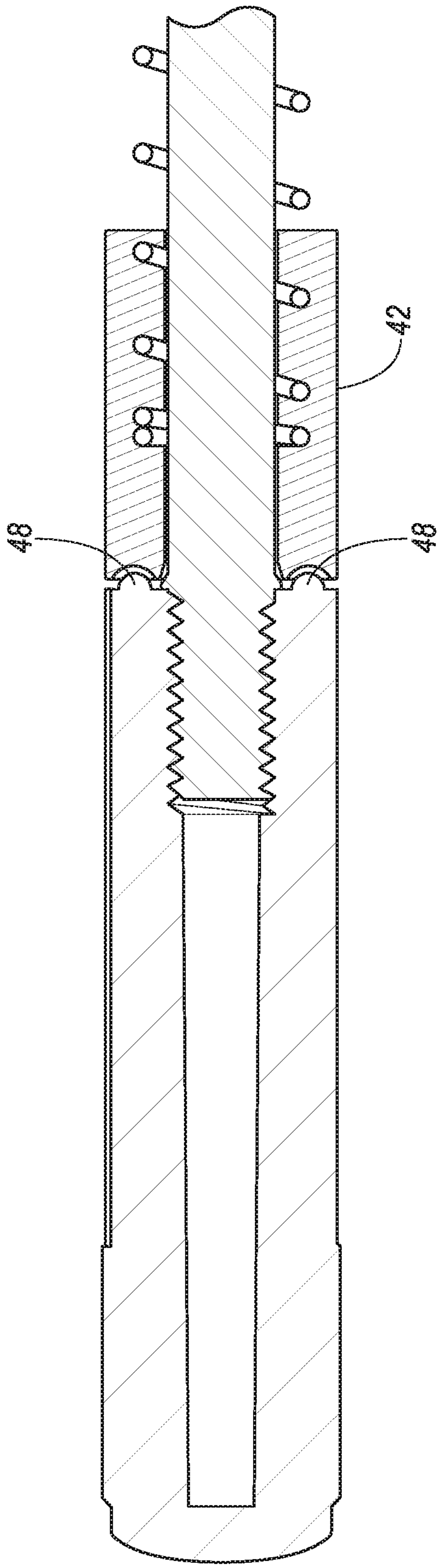
FIGS. 17, 18, and 19 depict the interaction between button 16 and sub-button 42 where button 16 is placed in the lock position and the unlocked position.
Figure 18:
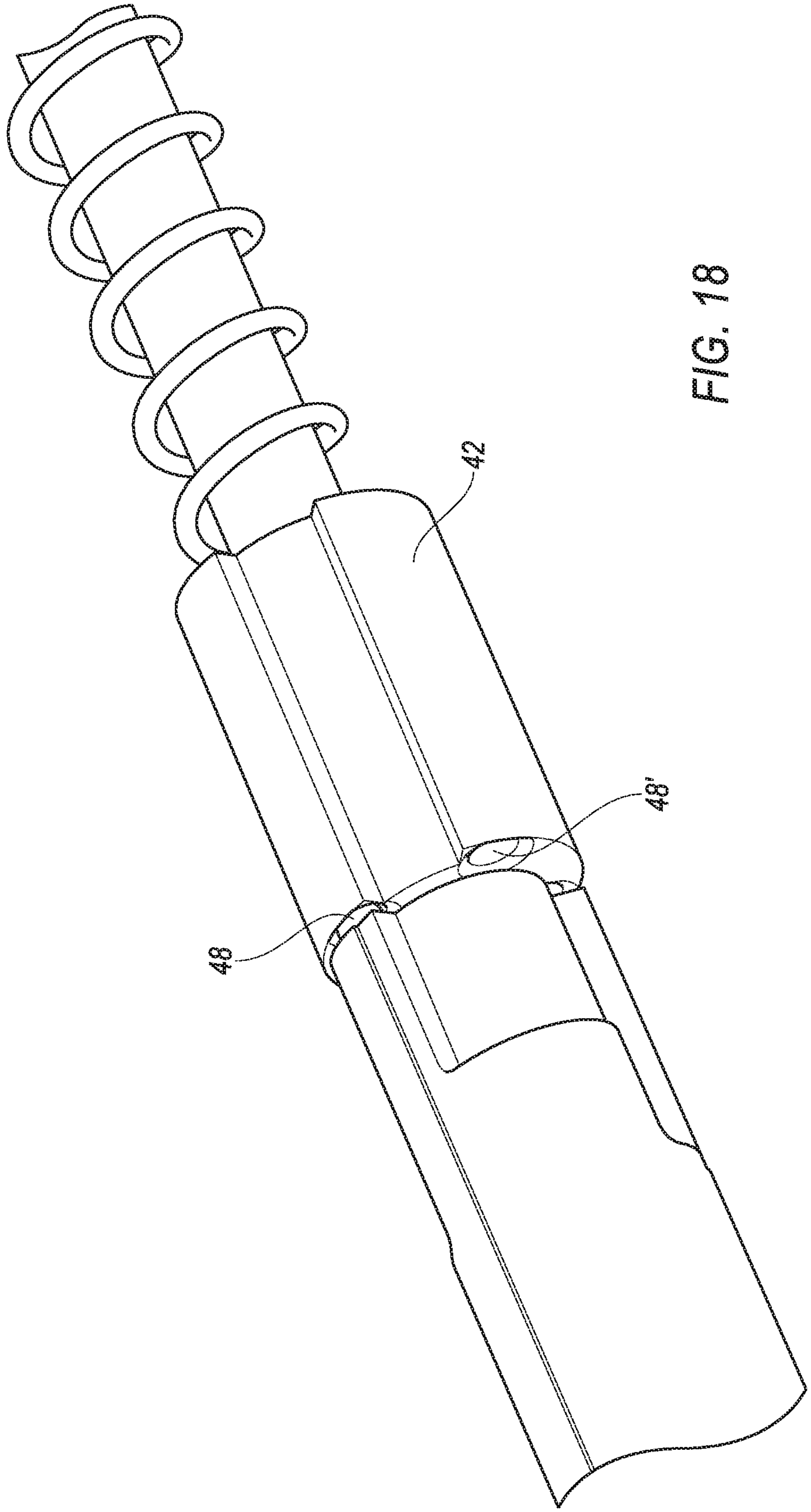
Figure 19:
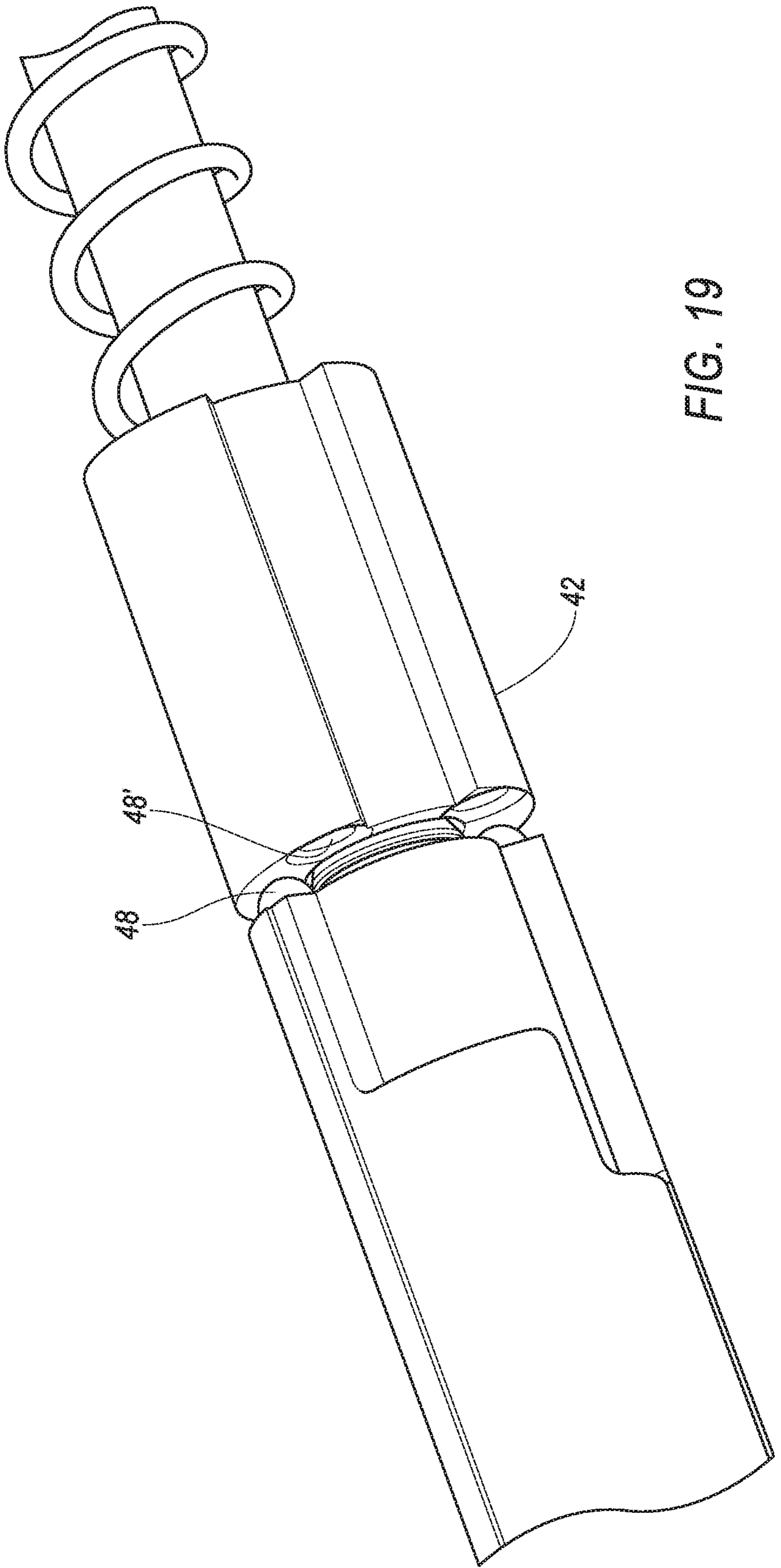

In the preferred embodiment of the invention, the method of changing the tool 12 or tool from the tool holder 10 is conducted without requiring the user to touch the tool 12. Replacement tools are contained in "no-touch" packaging (see FIGS. 15 and 16) that holds a replacement tool 12 or tools and importantly can also hold used/dull tools for safe storage or safe disposal. An alternate embodiment of the packaging contains a scratch-off or other marking surface for the user to note whether the tool has been used and has oil retention capability so that manufacturer or user may add oil to the package to be stored therein to prolong the life of the tools.

Figure 9:
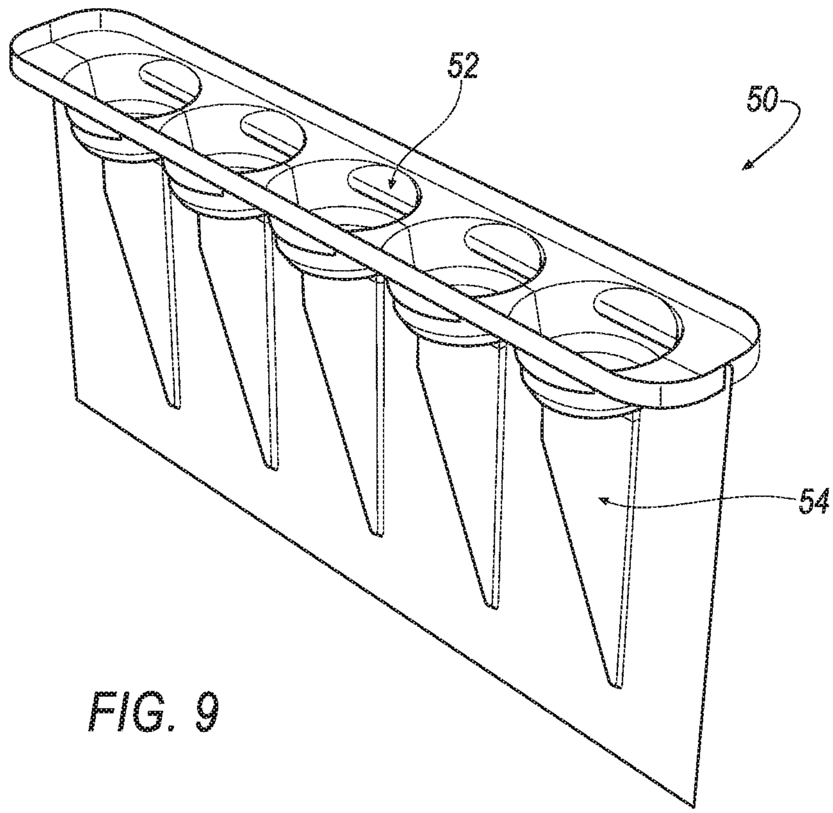
FIG. 9, FIG. 13, FIG. 14, FIG. 15 and FIG. 16 are isometric views of an exemplary tool packages.
Figure 10:
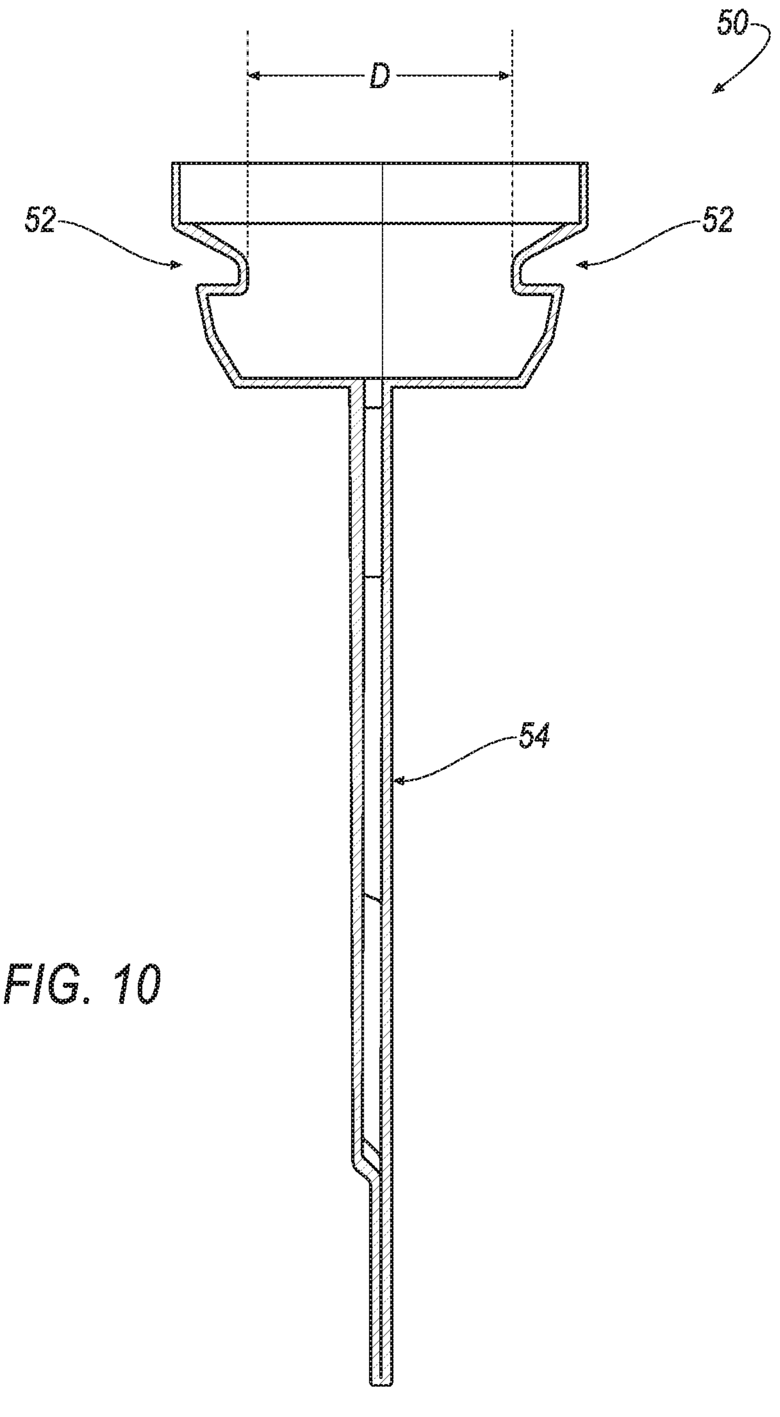
FIG. 10 is a side view of the exemplary tool package of FIG. 9.
Figure 11:
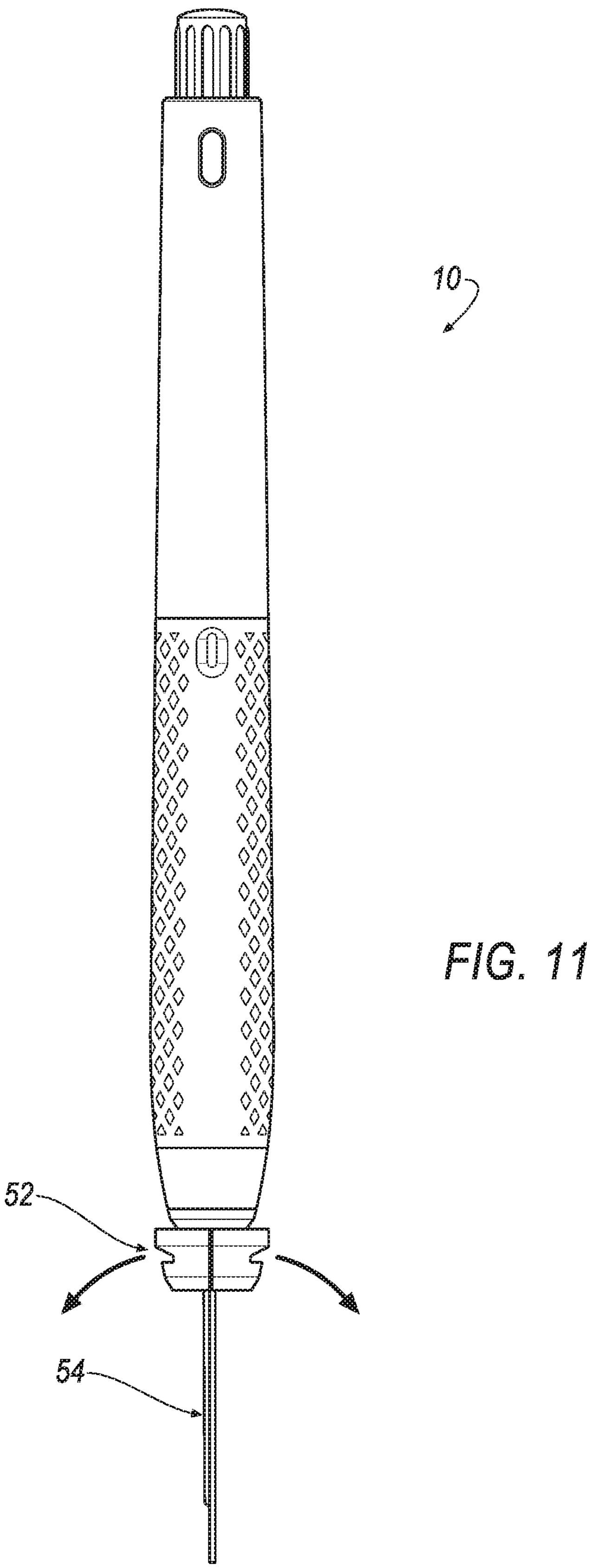
FIG. 11 is a side view of the exemplary tool holder of FIG. 9, wherein a tool is resident therein.
Figure 13:
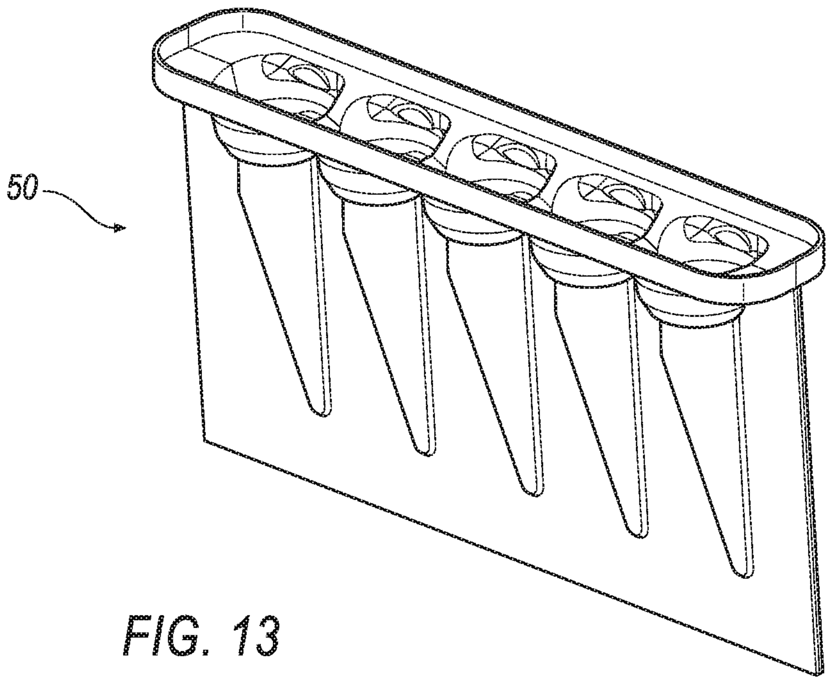
Figure 14:
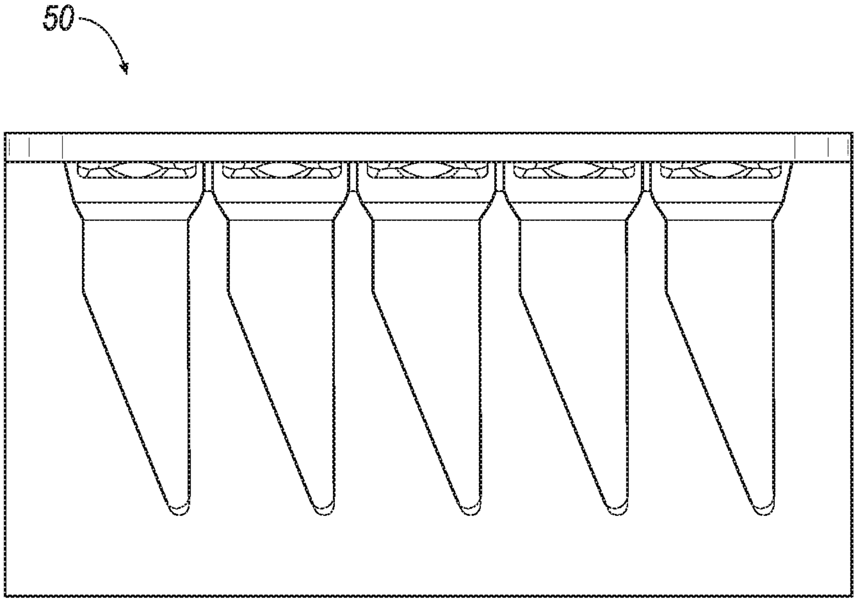

The preferred embodiment of the tool holder 10 is used in conjunction with tool package 50 as described above and elsewhere herein. Tool package 50 may contact 1) one or more lips 52 (see FIGS. 9 and 10) for capturing and securing tool overmold portion 30, and 2) a cavity 54 to shield/store one or more tools 12 or tool portions. Lip or lips 52 may be spaced "D" from other surfaces of the tool package so as to provide an interference fit around tool 12. This interference fit prevents tool from inadvertent separation from package 50. In an embodiment, lip 52 is resilient so that it allows a tool 12 or tool holder to pass into gap "D".

A method of changing the tool 12 of the tool holder 10 includes inserting the tool end of the tool holder 10 against the tool overmold 30 portion of the replacement tool 12 in the tool cavity 54 until overmold 30 comes into contact with the retainer 28. As this occurs, the lip capturing portion 52 deflects (e.g. flexes) outwardly, away from at least one of the tool holder, or the tool 12, allowing the tool overmold 30 to fully and securely seat into the tool holder 10 and specifically the retainer 28. This action may produce a "clicking" sensation, either audible, tactile, or both, thereby increasing the user's confidence that the tool 12 is securely fastened into the tool holder 10 and increases the safety of using the current invention over current alternatives. The flexing of the tool package 50 additionally allows the user to extract the replacement tool 12.

Optionally, the invention also includes an anti-roll feature 24 to prevent the tool holder 10 from rolling when placed on a surface.

In an embodiment, friction cap 22 and a comfort or "no fatigue" grip 14 can be fitted to the tool holder. Cap 22 is formed to fit snugly over the grip 14 to keep the cap 22 secure making it less likely the cap 22 will be inadvertently separated from tool 12. Grip 14 may also include ridges which provide additional comfort and prevents tool holder 12 from rolling off a table or other surface while also providing additional security through enhancing the user's ability to grip and control the tool holder 10. In an embodiment, grip 14 may extend over 50% longer than the current alternatives which gives the user more selection on where they can hold the tool holder 10 thus providing a greater area of comfort and long secure grip than other competitor tool holders.

What is claimed is:

1. A tool holder comprising:

a main body;

an activation button coupled to the fttai-d-main body:

a tool securing portion at least indirectly coupled to the activation button; and a tool comprising a working end and an overmold portion having a retained end, wherein the activation button is activatable into a first state for coupling the tool with the tool securing portion, wherein the activation button is activatable into a second state for releasably decoupling the tool from the tool securing portion, and wherein the overmold portion comprises, in order moving along the tool toward the retained end:

a first tapered wedge section having a first tapering angle;

a second tapered wedge section having a second tapering angle that is different than the first tapering angle;

a neck portion; and a bulbous shaped terminating geometry.

2. The tool holder of claim 1, wherein the tool securing portion comprises:

a retainer partially forming a volume; and at least one ball bearing at least partially captured within the volume of the retainer.

3. The tool holder of claim 1, wherein the tool securing portion and the tool are matingly keyed to prevent relative rotational movement therebetween.

4. The tool holder of claim 1, wherein the tool securing portion and the tool are matingly keyed permitting one, and only mating orientation between the two when the tool securing portion is coupled with the tool.

5. The tool holder of claim 1, wherein an exterior surface of the main body comprises an anti-roll feature to prevent the tool holder from rolling when placed on a surface.

6. The tool holder of claim 1, wherein the working end of the tool comprises a blade.

7. The tool holder of claim 6, wherein the first tapered wedge section and the second tapered wedge section each comprises opposing tapering edges with intervening flat sections circumferentially disposed between the opposing tapering edges.

8. The tool holder of claim 7, wherein the opposing tapering edges of the first tapered wedge section and the second tapered wedge section are aligned with a plane of the blade.

9. The tool holder of claim 1, wherein the second tapering angle is greater than the first tapering angle, such that the second tapered wedge section converges toward the neck portion at a steeper angle than the first tapered wedge section converges toward the second tapered wedge section.

10. The tool holder of claim 1, wherein the tool securing portion and the overmold portion of the tool are matingly keyed to prevent relative rotational movement therebetween.

* * * * *